US012461272B1

(12) United States Patent
Biesty et al.

(10) Patent No.: US 12,461,272 B1
(45) Date of Patent: Nov. 4, 2025

(54) SYSTEM AND METHOD FOR IDENTIFYING A PRODUCT

(71) Applicant: EOB Ventures LLC, Scottsdale, AZ (US)

(72) Inventors: David Biesty, Waterloo (CA); Peter Joseph Roth, Bixby, OK (US)

(73) Assignee: EOB Ventures LLC, Scottsdale, AZ (US)

( * ) Notice: Subject to any disclaimer, the term of this patent is extended or adjusted under 35 U.S.C. 154(b) by 0 days.

(21) Appl. No.: 19/227,529

(22) Filed: Jun. 4, 2025

(51) Int. Cl.
*G01V 8/14* (2006.01)
*G06V 10/14* (2022.01)

(52) U.S. Cl.
CPC ............... *G01V 8/14* (2013.01); *G06V 10/14* (2022.01)

(58) Field of Classification Search
CPC .................................. G01V 8/14; G06V 10/14
See application file for complete search history.

(56) References Cited

FOREIGN PATENT DOCUMENTS

CN 111696262 A * 9/2020 ............... G07F 11/30

* cited by examiner

*Primary Examiner* — Tony Ko
(74) *Attorney, Agent, or Firm* — Michael D. Eisenberg

(57) ABSTRACT

A system for identifying a product, the system comprising a light emitter, a sensor, and a control unit. The light emitter is configured to be disposed on a barrier joined to a shelf. The sensor is configured to be disposed on the barrier, and located at a respective position facing a space configured to be occupied by a product. The control unit controls an operation of the light emitter and to receive sensor data from the sensor, for transmission of the sensor data indicative of light received by the sensor to an analysis unit configured for identifying the product present in the space, based on at least one first value of a parameter of the emitted light and at least one second value of the parameter of modified light received by the sensor, the modified light being light emitted by the emitter and modified by interaction with the product.

17 Claims, 11 Drawing Sheets

| Emitted Light | Modified Light: Product 1 | Modified Light: Product 2 | Modified Light: Product 3 |
|---|---|---|---|
| I1 | I10 | I11 | I12 |
| I2 | I13 | I14 | I15 |
| I3 | I16 | I17 | I18 |
| I4 | I19 | I20 | (I21) |
| I5 | I22 | (I23) | I24 |
| I6 | I25 | I26 | I27 |
| I7 | (I28) | I29 | I30 |
| I8 | I31 | I32 | I33 |
| I9 | I34 | I35 | I36 |

Fig. 10

| Emitted Light | Modified Light: Product 1 | Modified Light: Product 2 | Modified Light: Product 3 |
|---|---|---|---|
| λ1 | λ10 | λ11 | λ12 |
| λ2 | λ13 | λ14 | λ15 |
| λ3 | λ16 | λ17 | λ18 |
| λ4 | λ19 | (λ20) | λ21 |
| λ5 | (λ22) | λ23 | λ24 |
| λ6 | λ25 | λ26 | (λ27) |
| λ7 | λ28 | λ29 | λ30 |
| λ8 | λ31 | λ32 | λ33 |
| λ9 | λ34 | λ35 | λ36 |

Fig. 11

| Emitted Light | Modified Light: Product 1 | Modified Light: Product 2 | Modified Light: Product 3 |
|---|---|---|---|
| λ1, I1 | λ4, I4 | λ5, I5 | λ6, I6 |
| λ1, I2 | λ7, I7 | λ8, I8 | (λ9, I9) |
| λ1, I3 | λ10, I10 | λ11, I11 | λ12, I12 |
| λ2, I1 | λ13, I13 | λ14, I14 | λ15, I15 |
| λ2, I2 | λ16, I16 | λ17, I17 | λ18, I18 |
| λ2, I3 | (λ19, I19) | λ20, I20 | λ21, I21 |
| λ3, I1 | λ22, I22 | λ23, I23 | λ24, I24 |
| λ3, I2 | λ25, I25 | (λ26, I26) | λ27, I27 |
| λ3, I3 | λ28, I28 | λ29, I29 | λ30, I30 |

Fig. 12

```
SALES OVER:     PAST YEAR    PAST MONTH    PAST WEEK   PAST DAY   CUSTOM

PRICE/UNIT    REVENUE ($)
    COKE            12   CANS      1.5          18.0
    PEPSI           10   CANS      1.5          15.0
    SPRITE           8   CANS      1.5          12.0
    7UP              3   CANS      1.5           4.5
    GINGER ALE       5   CANS      1.5           7.5
    MINUTE MADE OJ   7   BOTTLES   2.0          10.0

TOTAL REVENUE:    67.0
```

| I \ IA | IA1 | IA2 | IA3 | IA4 | IA5 |
|---|---|---|---|---|---|
| I1 | I'1 | I'2 | I'3 | I'4 | I'5 |
| I2 | I'6 | I'7 | I'8 | I'9 | I'10 |
| I3 | I'11 | I'12 | I'13 | I'14 | I'15 |
| I4 | I'16 | I'17 | I'18 | I'19 | I'20 |
| I5 | I'21 | I'22 | I'123 | I'24 | I'25 |

Fig. 15

| Product | Emitted Light | Modified Light: | Modified light function |
|---|---|---|---|
| Product 1 | $\lambda a, Ia$ | $\lambda j, Ik$ | $f(\lambda j, Ik)$ |
| Product 2 | $\lambda b, Ib$ | $\lambda l, Im$ | $f(\lambda l, Im)$ |
| Product 3 | $\lambda c, Ic$ | $\lambda n, Io$ | $f(\lambda n, Io)$ |
| Product 4 | $\lambda d, Id$ | $\lambda p, Iq$ | $f(\lambda p, Iq)$ |
| Product 5 | $\lambda e, Ie$ | $\lambda r, Is$ | $f(\lambda r, Is)$ |
| Product 6 | $\lambda f, If$ | $\lambda t, It$ | $f(\lambda t, It)$ |
| Product 7 | $\lambda g, Ig$ | $\lambda u, Iu$ | $f(\lambda u, Iu)$ |

Fig. 16a

| Product | Emitted Light | Modified Light: | Modified light function |
|---|---|---|---|
| Unknown Product | $\lambda w = \lambda' a$<br>$Iw = I'a$ | $\lambda j, Ik$ | $f(\lambda j, Ik)$ |

Fig. 16b

| Product | Emitted Light | Modified Light: | Modified light function |
|---|---|---|---|
| Unknown Product | $\lambda w = \lambda a$<br>$Iw = Ia$ | $\lambda j, Ik$ | $f(\lambda j, Ik)$ |

Fig. 16c

SYSTEM AND METHOD FOR IDENTIFYING A PRODUCT

TECHNICAL FIELD

The present invention, in some embodiments thereof, relates to the field of retail, and more specifically to the identification of products on shelves.

BACKGROUND OF THE INVENTION

In retail stores, products are placed on shelves, for being displayed and accessible to customers, in order to make it easy on the customers to located and buy the products they desire, thereby increasing sales and revenue.

Tracking the products on the shelves at any time can help retailers track the stock of products (whether a product is in stock or out of stock, for example). The tracking also provides information about the sales of the products. This information that can be analyzed in order to arrive at conclusions regarding the products, that can enable the retailers—for example—to optimize placement of the products on the shelves in order to increase the visibility of certain products and thereby increase sales.

BRIEF SUMMARY OF EMBODIMENTS OF THE INVENTION

The present invention relates to an automated product tracking system, to enable retailers to track the products on shelves in real time.

Therefore, an aspect of some embodiments of the present invention relates to a system for identifying a product located on a shelf, the system comprising at least one light emitter, one or more light sensors, and control unit. The at least one light emitter is configured to be disposed on at least one barrier joined to a shelf, the at least one barrier separating respective rows on the shelf, each row configured to hold at least one product. The one or more light sensors configured to be disposed on the at least one barrier, wherein the one or more light sensors are located at respective positions facing spaces configured to be occupied by respective ones of the at least one product. The control unit is configured to control an operation of the at least one light emitter and to receive sensor data from each of the one or more light sensors, for transmission of the sensor data indicative of light received by each of the one or more light sensors to an analysis unit configured for identifying the at least one product present in the respective space, based on at least one first value of a parameter of the emitted light and at least one second value of the parameter of modified light received by each of the one or more light sensors, the modified light being light emitted by the at least one emitter and modified by interaction with the respective product.

In a variant, the control unit is configured to receive an ambient value of the ambient light at or in a vicinity of the shelf, and to compensate for a difference between the ambient value and a baseline value of the at least one parameter of ambient light, by: controlling the at least one emitter to emit the emitted light with an adjusted first value of the at least one parameter, based on the ambient value; and/or controlling a sensitivity of at least one the one or more light sensors based on the ambient value.

In another variant, the system comprises a flexible substrate having an adhesive backing, the flexible substrate being configured to be joined to the at least one barrier, wherein the at least one light emitter and the one or more light sensors are laminated on a flexible substrate.

A trace connecting to the at least one light emitter and the one or more light sensors may be laminated on the flexible substrate, the trace being configured to be connected to the control unit for communication between the at least one light emitter and the one or more light sensors and the control unit.

In yet another variant, the system includes the at least one barrier, wherein the at least one barrier comprises: the at least one light emitter and the one or more light sensors; and a clip extending from a bottom corner of the at least one barrier, the clip being configured for removably securing the at least one barrier to the shelf.

The system may further include the shelf, wherein: the shelf comprises first traces connected to the control unit; the at least one barrier comprises second traces connected to the at least one emitter and to the one or more light sensors; upon securing the at least one barrier to the shelf, the first traces electrically connect to the second traces, to form communication lines between the control unit and the at least one emitter and the one or more light sensors.

In a further variant, the at least one light emitter and the one or more light sensors are configured to be disposed on a same side the at least one barrier, such that for each of one the one or more lights sensors, the light emitted by the at least one light emitter reflects from the respective product back towards the light sensor, such that the modified light is reflected light.

In yet a further variant, the at least one light emitter and the one or more light sensors are configured to be disposed on opposite surfaces the at least one barrier, such that for each of one the one or more lights sensors, light emitted by the at least one light emitter of a subsequent barrier transmits through the respective product towards the light sensor, such that the modified light is transmitted light.

In some embodiments of the present invention, the system includes the analysis unit.

In a variant, the analysis unit is located remotely from the control unit and communicates with the control unit via a network.

The network may include internet.

In another variant, the analysis unit stores a database which comprises a list plurality of products, and—for each one of the products of the list—a third value of the at least one parameter of the emitted light and a fourth value of the at least one parameter of the modified light, based on an experimental trial in which the emitted light having the third value of the at least one parameter interacted the product of the list and has yielded the modified light having the at least one fourth value of the at least one parameter, such that a combination of the third value and of the fourth value is unique to the product of the list. The analysis unit is configured to identify a product on the shelf as one of the products of the list, by processing the first value, the second value, the third value, and the fourth value.

Another aspect of some embodiments of the present invention relates to a method for identifying a product on a shelf, the method comprising: (i) providing a database which comprises a list of plurality of products, and—for each one of the products of the list—a first value of the at least one parameter of emitted light and a second value of the at least one parameter of modified light, based on an experimental trial in which first emitted light having the first value of the at least one parameter has interacted with the product of the list and has yielded first modified light having the second value of the at least one parameter at a baseline ambient lighting having a baseline value of the at least one baseline parameter, and wherein a combination of the first value and of the second value is unique to the product of the list; (ii) detecting an ambient value of the at least one parameter of a second ambient light at a shelf; (iii) providing a light emitter configured to emit a second emitted light, the second emitted light having the at least one parameter with a third value; (iv) providing a sensor for detecting a second modified light, the second modified light being generated by interaction of the second emitted light with an unknown product, the second modified light having a fourth value of the at least one parameter; (v) adjusting a sensitivity of the sensor to compensate for a difference between the first ambient light and the second ambient light, such that an ambient light detected by the sensor is about equal to the first ambient light at the shelf even the first ambient light and the second ambient light are different; (vi) using the light emitter to illuminate an unknown product on the shelf with the second emitted light, wherein the second value is controlled to correspond to the first value; (vii) detecting the second modified light via the sensor; (viii) processing the first value and the second value of the at least one product from the database, and the third value of the fourth value corresponding to the unknown product, to determine whether the unknown product corresponds to one of the products of the plurality of products.

In a variant, wherein the processing comprises comparing the fourth value to the second value, to determine whether the unknown product corresponds to the at least one products of the list.

In another variant, the database comprises the list of a plurality of products, and—for each one of the products of the list—the first value of a plurality of predetermined first values of the at least one parameter of emitted light and a second value of the at least one parameter of modified light. The using of the light emitter to illuminate an unknown product on the shelf with the second emitted light comprises: using the light emitter to illuminate an unknown product on the shelf with the second emitted light, the second emitted light being in the form of a sequence of second emitted light beams, each of the beams having the at least one parameter having a respective third value which corresponds to the a respective one of the first values. The second modified light is in form of a sequence of second light modified light beams, each second modified light beam having a respective fourth value of the at least one parameter. Processing the first value, the second value, the third value, and the fourth comprises processing the combinations of the first values and the second values corresponding to products in the list, and combinations of the respective third values and the respective fourth values associated with the unknown product.

Yet another aspect of some embodiments of the present invention relate to a method for identifying a product on a shelf, the method comprising: (i) providing a database which comprises a list of comprising at one or more products, and—for each one of the one or more products of the list—a first value of the at least one parameter of emitted light and a second value of the at least one parameter of modified light, based on an experiments trial in which first emitted light having the first value of the at least one parameter has interacted with the product of the list and has yielded first modified light having the second value of the at least one parameter at a baseline ambient lighting having a baseline value of the at least one parameter, and wherein a grouping of the first value and of the second value is unique to the product of the list; (ii) detecting an ambient value of the at least one parameter of a second ambient light at a shelf; (iii) providing a light emitter configured to emit a second emitted light, the second emitted light having the at least one parameter with a third value; (iv) providing a sensor for detecting a second modified light, the second modified light being generated by interaction of the second emitted light with an unknown product, the second modified light having a fourth of the at least one parameter; (v) adjusting the light emitter to compensate for a difference between the first ambient light and the second ambient light, such that the third value is an adjustment of the first value in the database; (vi) using the light emitter to illuminate an unknown product on the shelf with the second emitted light; (vii) detecting the second modified light via the sensor; (viii) processing the first value and the second value of the one or more products of the list, and the third value and fourth value corresponding to the unknown product, to determine whether the unknown product corresponds to one of the products of the plurality of products.

In a variant, the database comprises a list plurality of products, and—for each one of the products of the list—a first respective value of a plurality of first predetermined values of the at least one parameter of emitted light and a second value of the at least one parameter of modified light. The using of the light emitter to illuminate an unknown product on the shelf with the second emitted light comprises: using the light emitter to illuminate an unknown product on the shelf with the second emitted light, the second emitted light being in the form of a sequence of second emitted light beams, each of the beams having the at least one parameter having a respective second value which is an adjustment of a respective one of the plurality of predetermined first values. The second modified light is in form of a sequence of second light modified light beams, each second modified light beam having a respective fourth value of the at least one parameter. Processing the first value and the second value of the one or more products of the list, and the third value and fourth value corresponding to the unknown product comprises processing the combinations of the first values and the second values from the database, and combinations of the respective first values of which the second values are adjustments of and the respective fourth values.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 10 is a table illustrating the choice of intensity values to associate to respective products, according to some embodiments of the present invention;

FIG. 11 is a table illustrating the choice of wavelength values to associate to respective products, according to some embodiments of the present invention;

FIG. 12 is a table illustrating the choice of combinations of intensity and wavelength values to associate to respective products, according to some embodiments of the present invention;

FIG. 15 is an example of a look-up table constructed via experimental data, for determining the adjusted intensity, when an initial intensity and the intensity and intensity of ambient light are given;

FIG. 16a illustrates a database including a list of known products, and for each product a unique combination of first values of parameters of emitted light and first values of modified light;

FIG. 16b illustrates a unique combination of first values of parameters of emitted light and first values of modified light for an unknown product, in the embodiment in which the emitted light is adjusted to compensate for the variability of ambient light, according to some embodiments of the present invention; and FIG. 16c illustrates a unique combination of first values of parameters of emitted light and first values of modified light for an unknown product, in the embodiment in which the sensitivity of the sensor is adjusted to compensate for the variability of ambient light, according to some embodiments of the present invention.

Figure 1:
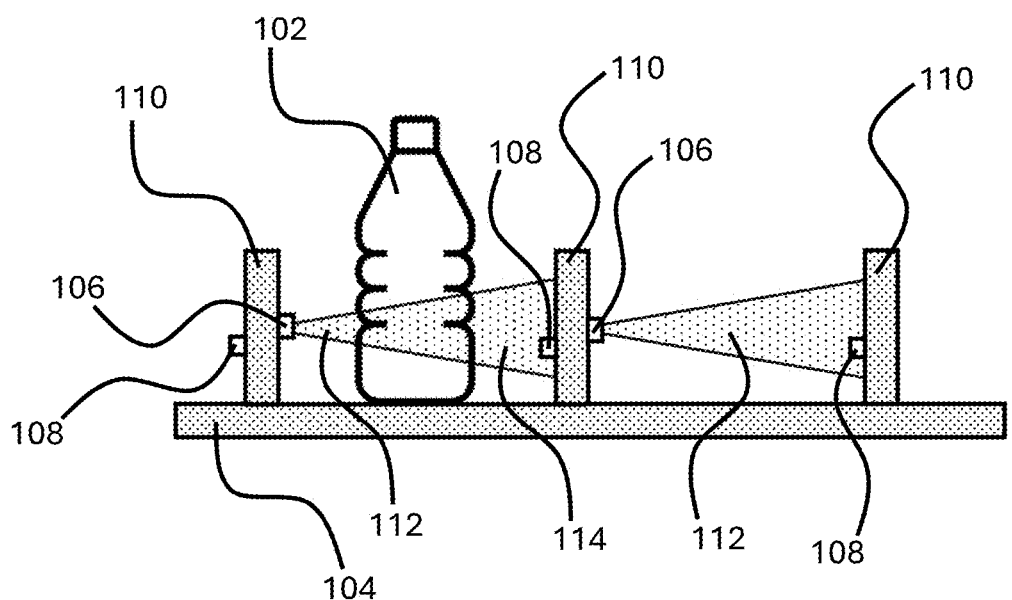
FIG. 1 illustrates a system in which a product can be detected and identified via analysis of light passing through the product according to some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention is based on the principle different products impinged by emitted light modify the emitted light (thus, giving rise to modified light). The parameters of the modified light depend on the properties of the product. Therefore, by analyzing the modified light associated with different products, it is possible to find a property of the modified light that is unique to that product. Therefore, according to some embodiments of the present invention, a database of unique "fingerprints" of different products is provided. Once this database is known, a plurality of light emitters and a plurality of light sensors can be placed on a shelf, such that each light emitter emits emitted light and the emitted light interacts with the product and becomes modified light. The modified light is sensed by a sensor and analyzed to extract the property of the modified light. The property of the modified light is compared to the parameters in the database. If a match is found, the product on the shelf is identified as the product in the database associated with modified light having the same property. The parameter of the modified light may include, for example, one or more of intensity and wavelength.

If no match is found, the product on the shelf is a product type that was not analyzed before and was not introduced to the database. If this happens, in some embodiments of the present invention, an administrator of the database is prompted to enter a new product name or identification for this new product. Once the new product name or identification is entered, the parameter of the modified light of the new product is entered into the database.

FIG. 1 illustrates a system in which a product can be detected and identified via analysis of light passing through the product according to some embodiments of the present invention.

Figure 3:
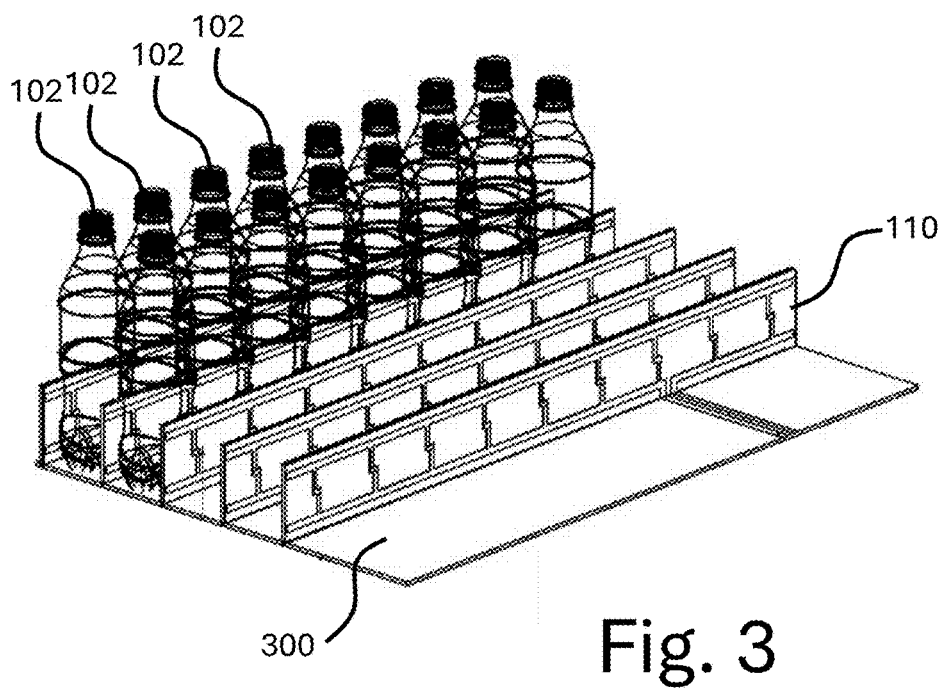
FIGS. 3 and 4 illustrate a plurality of rails mounted on a glide, according to some embodiments of the present invention.

In some embodiments of the present invention, a system 100 is provided for identifying a product 102 on a shelf 104. The system 100 includes at least one light emitter 106 and at least one sensor 108. The light emitter 106 and the sensor 108 are configured to be disposed on barriers 110, such that at least one product 102 is located in a space between the barriers 100. In some embodiments of the present invention, the space between the barriers holds a row of products 102 (as shown in FIG. 3, for example). In this embodiment, the system 100 includes a plurality of sensors disposed along the barriers and either an elongated light emitter extending along the barrier or a plurality of light emitters disposed along the barrier. In this manner, each sensor is disposed near each product, such that emitted light (either emitted by one of a plurality of light emitters which is near the product, or by the continuous light emitter extending along the barrier) interacts with the product and becomes modified light, and the modified light that has interacted with the product is received by the sensor disposed near the product.

In the example of FIG. 1, the interaction between the emitted light and the product is in the form of transmission. Emitted light 112 is transmitted through the product 102 and modified depending on the properties of the product to become modified light 114. Therefore, the light emitter 106 and the sensor 108 are disposed on opposite sides of the same barrier 110. In this manner, light emitted by the light 106 emitter of a barrier transmits through the product 102 towards the light sensor 108 located on the subsequent barrier.

It can be seen that in the absence of a product, the emitted light 112 is not modified by interaction with a product and reaches the sensor 108 directly. Analysis of the sensor data can reveal this and therefore conclude that that the product is absent at the location associated with the sensor 108.

The light emitter 106 may be any type of light emitter that emits light that may be visible, ultra-violet, or infra-red. In some embodiments of the present invention, the light emitter may be an adjustable light emitter, in which at least one of wavelength and intensity can be controlled. A non-limiting example of a light emitter may be a light-emitting diode (LED). Any other type of light emitter may be used and is within the scope of the present invention.

The sensor 108 may be an optical sensor configured to measure an intensity and/or wavelength of the modified light. In some embodiments of the present invention, the sensor may include a Charge Coupled Device (CCD) camera that captures an image of the object illuminated by the light emitter. The image is analyzed by a remote analysis unit, as will be explained further below.

Figure 2:
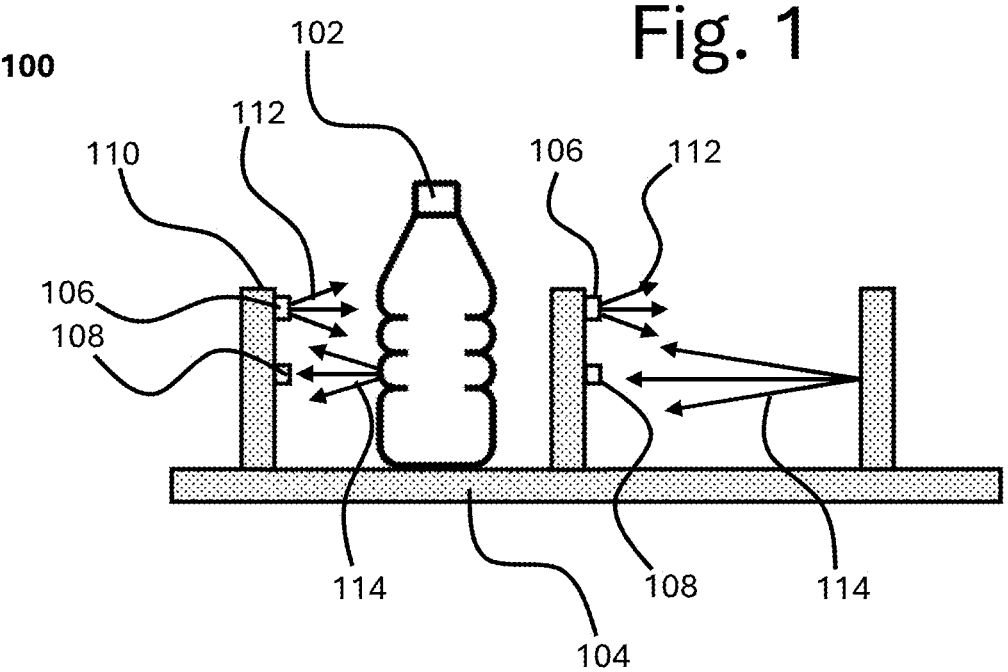
FIG. 2 illustrates a system in which a product can be detected and identified via analysis of light reflected by the product, according to some embodiments of the present invention.

FIG. 2 illustrates a system in which a product can be detected and identified via analysis of light reflected by the product, according to some embodiments of the present invention.

The system 100 of FIG. 2 is similar to the system 100 of FIG. 1. The difference between FIG. 1 and in FIG. 2 lies in the fact that in FIG. 2, the light emitter 106 and the sensor 108 are disposed on the same side of the barrier. In this manner, the emitted light 112 interacts with product 102 and is modified by reflection from the product. The reflected light is the modified light 114.

In the absence of a product, the modified light is light that is reflected from the subsequent barrier. As such, the reflected light is substantially weaker (having a lower intensity) than light that would have been reflected from a product that was closer to the light emitter(s) 106 and the sensor 108. If the intensity of the modified (reflected) light 114 detected by a sensor 108 is below a certain level, then the absence of a product near the sensor is determined.

Figure 7:
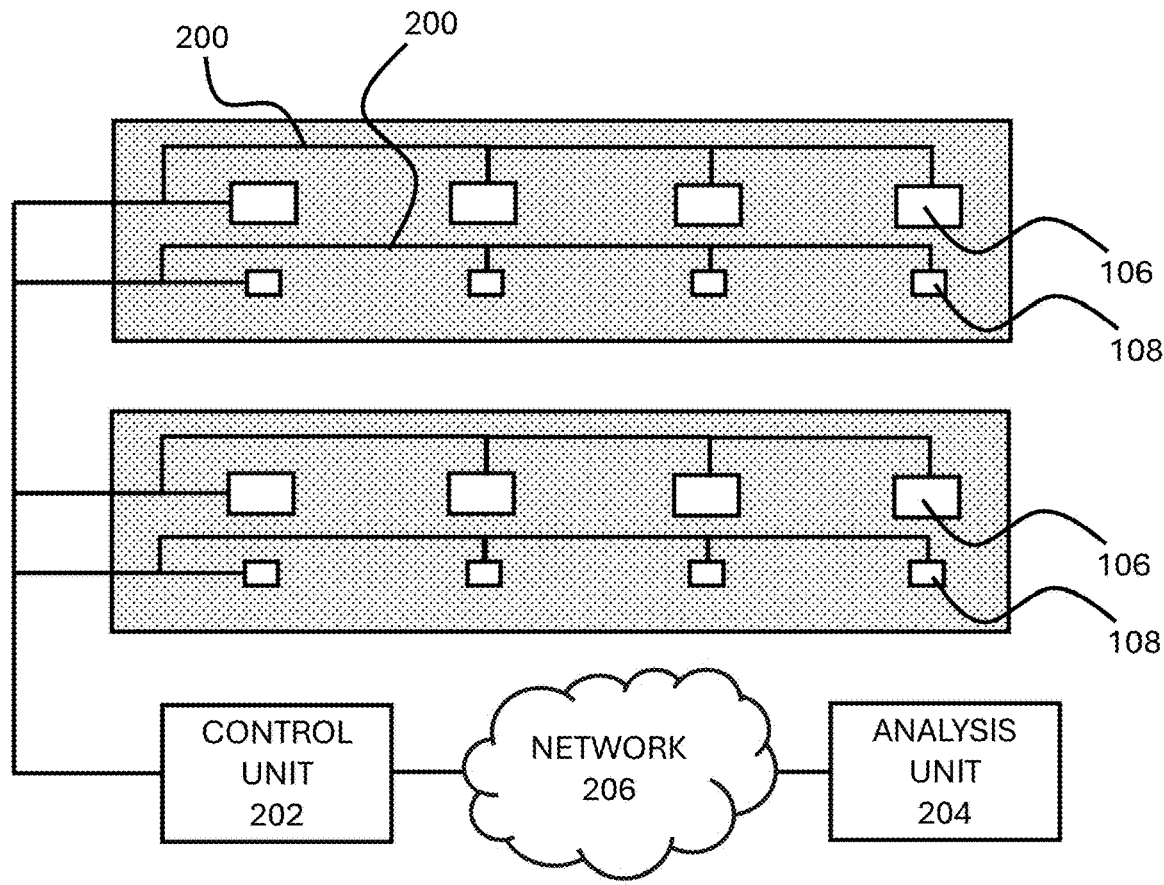
FIG. 7 illustrates communication between a plurality of elements of the system, according to some embodiments of the present invention.

FIG. 7 illustrates communication between a plurality of elements of the system, according to some embodiments of the present invention.

The system of the present invention may include a plurality of light emitters 106 and a plurality of sensors 108, which may be joinable to a single barrier or a plurality of barriers. The system 100 may include traces 200 configured to enable communication with a control unit 202, which may or may not be part of the system. The control unit 202 is configured to control the operation of the one or more light emitters 106 and the one or more sensors 108 according to input data and according to instructions that is stored in the control unit.

The data collected by the sensors may be sent to a remote analysis unit 204 via a network 206. In some embodiments of the present invention, the remote analysis unit 204 is configured to analyze the one or parameters of the modified light detected by sensor, to detect whether a product is present and to identify the product, if the product is present. In some embodiments of the present invention, the control unit 202 is configured to analyze the sensor data to determine whether a product is present near the sensor and to send the sensor data to the analysis unit 204 to identify the product only if the product is present.

Figure 8:
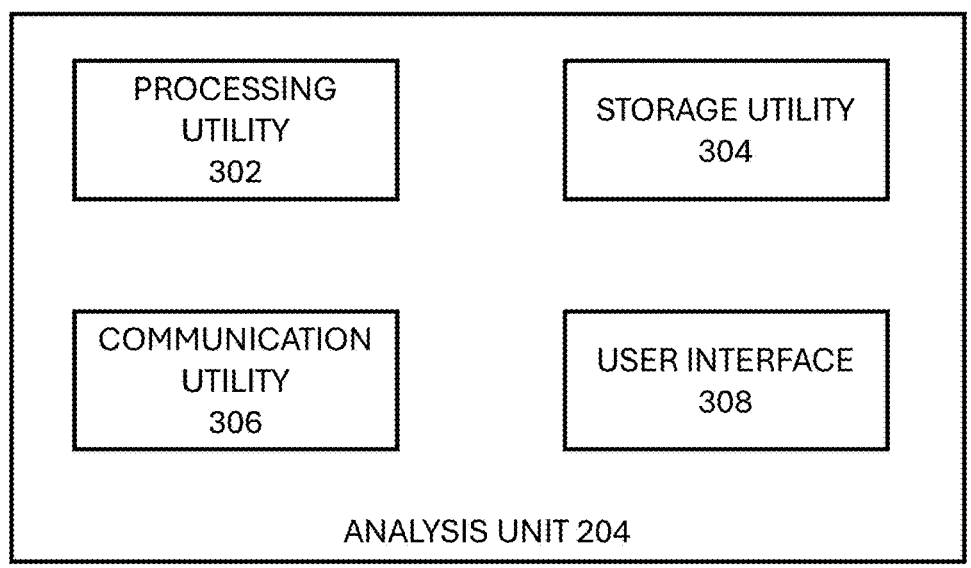
FIG. 8 is a block diagram of the analysis unit, according to some embodiments of the present invention.

FIG. 8 is a block diagram of the analysis unit, according to some embodiments of the present invention.

The system of the present invention is in communication with the analysis unit 204, which may be part of the system of the present invention. The analysis unit 204 includes a processing utility 302, a storage utility 304, a communication utility 306, and a user interface 308. All utilities include software and/or hardware units configured to enable respective functions.

The analysis unit 204 may be a server accessible to a plurality of control units 202. The storage utility 304 is a non-volatile storage unit which stores a database of products and the parameter or parameters of modified light associated with each product. The storage utility 304 also stores instructions for the operation of the analysis unit. The communication utility enables communication between the analysis unit 204 and the control unit(s) 202. The processing utility 302 is configured to process the sensor data received by a control unit and to compare the sensor data to the parameter or parameters in the database, in order to identify the product. The analysis unit 204 may include a user interface utility 308, which allows access to a user to view the contents of a shelf in real time and to receive information about the sales of the items on a shelf.

Figures 13, 14:
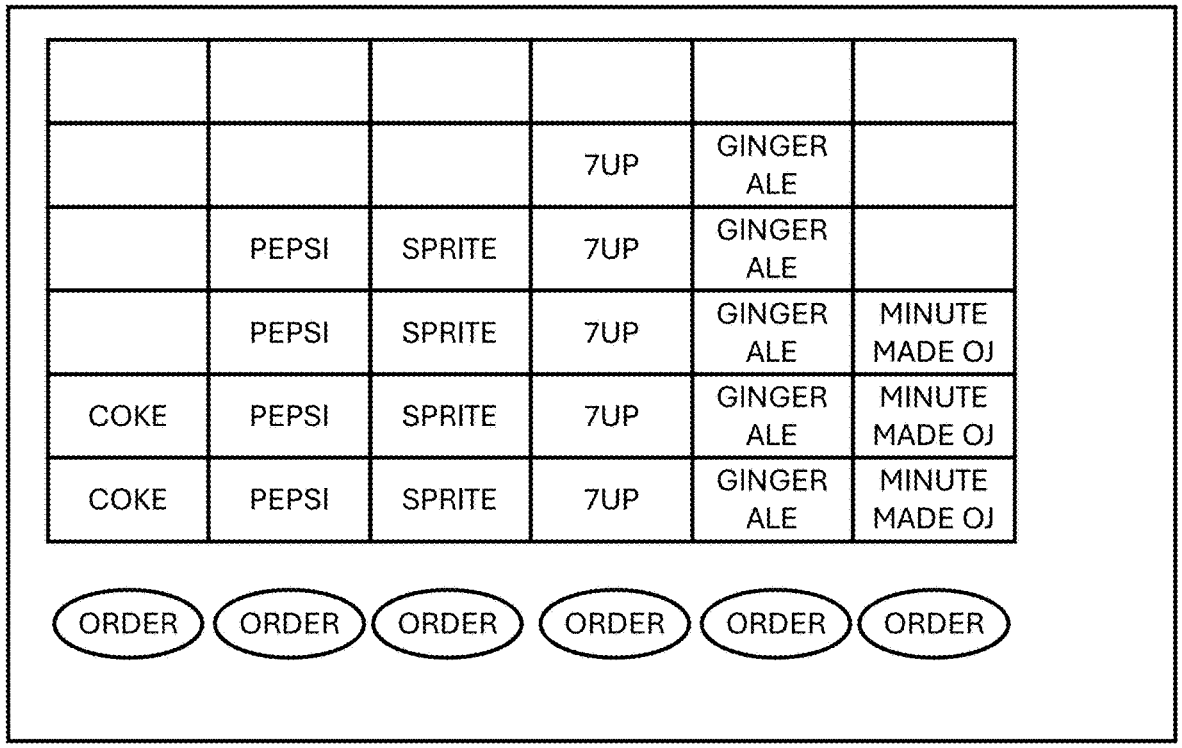
FIGS. 13 and 14 are examples of screenshots displaying information gathered by the analysis of a shelf, according to some embodiments of the present invention.

FIGS. 13 and 14 illustrate non-limiting examples of information display to a user. FIG. 13 is a screenshot displaying the contents of a shelf holding different beverages in real time. The screen of FIG. 13 may also include "order" buttons, which connect the user to the supplier to order selected beverages. FIG. 14 illustrates information about the sales of beverages from the shelf over a desired time period. The user may choose to view the sales over a year, a month, a week, a day, or a custom period. FIGS. 13 and 14 are only examples of information displayed to the user. Other information may be displayed too.

Figure 4:
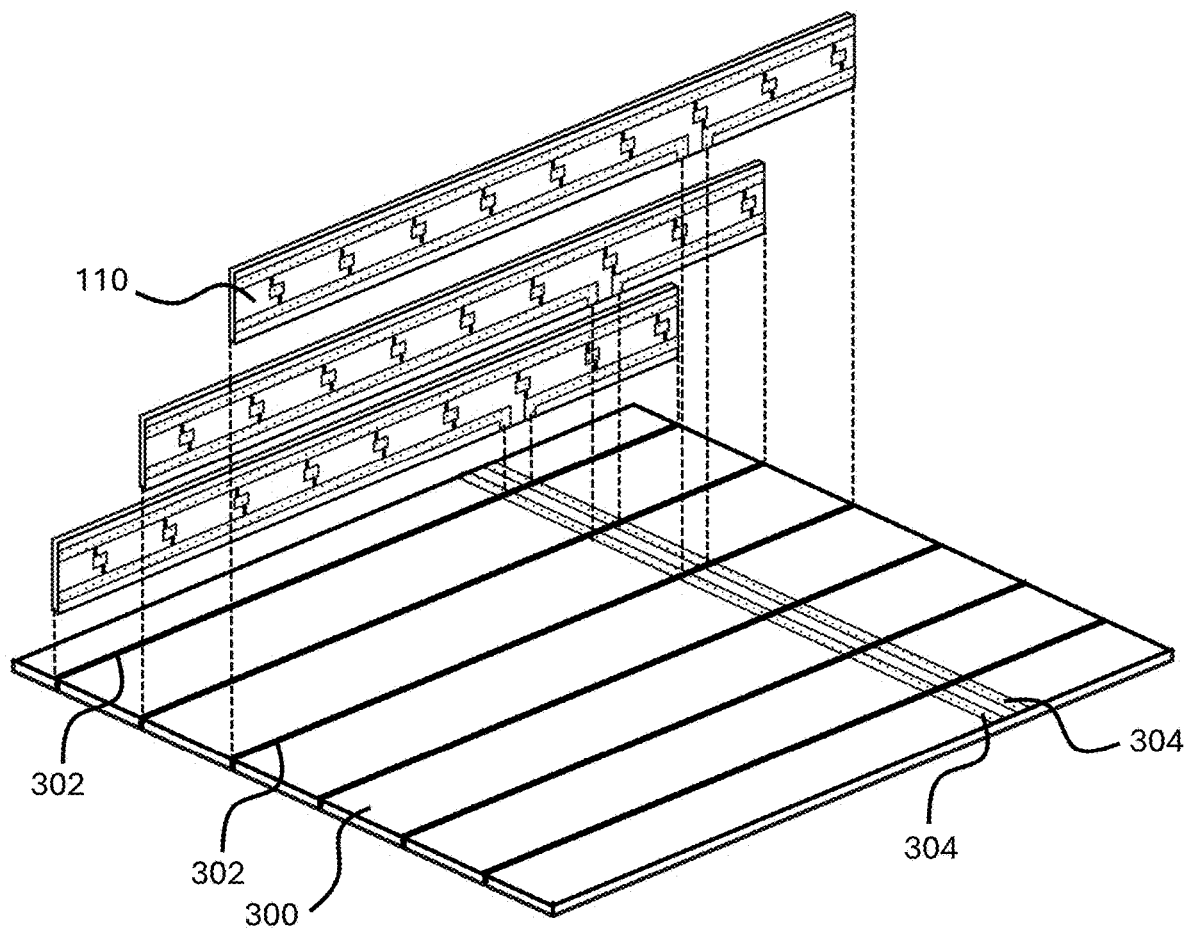
Figure 5:
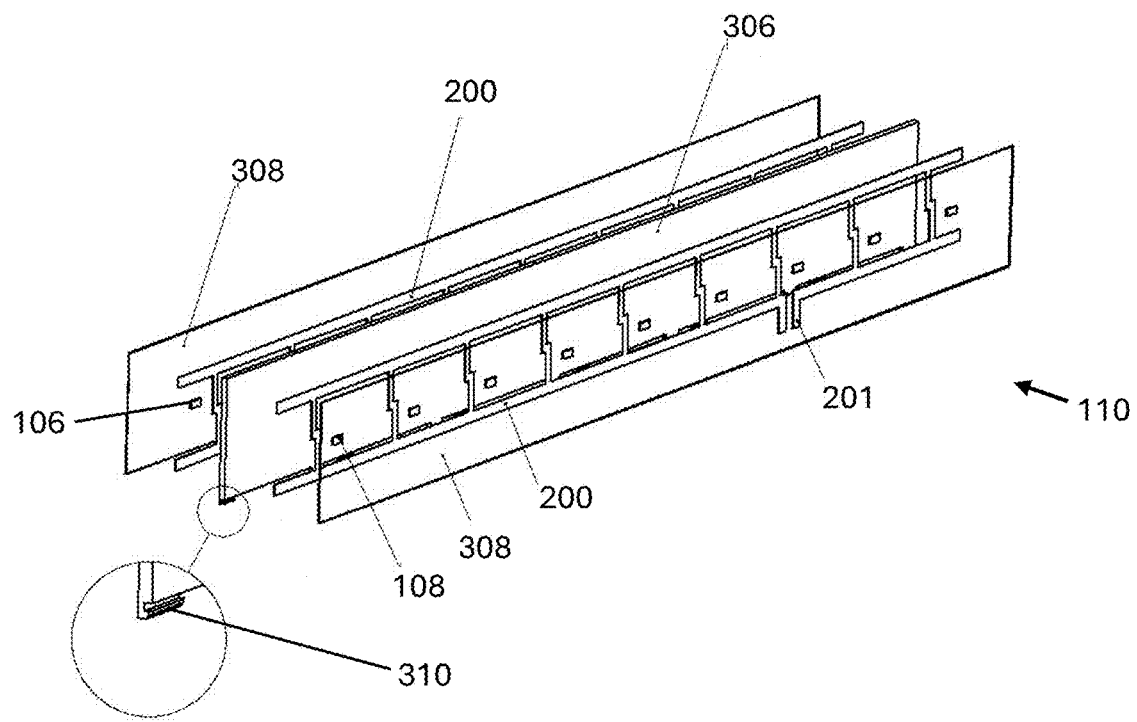
FIG. 5 is an exploded view of a rail, according to some embodiments of the present invention.

FIGS. 3 and 4 illustrate a plurality of removable barriers mounted on a glide, according to some embodiments of the present invention. FIG. 5 is an exploded view of a removable barrier, according to some embodiments of the present invention.

In some embodiments the present invention, the system of present invention incudes a glide 300 having a plurality of tracks 302. The tracks are configured to receive removable barriers 110, which have sensors and light emitters, as described for the barriers of FIGS. 1 and 2. The removable barriers 110 may be placed on desired tracks 302 in order to create enough space between barriers 110 to host products having different sizes.

In some embodiments, each removable barriers 110 includes traces 200 connected to the light emitters and to the sensors 108. The traces 200 are connected to the control unit by wire or wirelessly, as mentioned above.

In some embodiments of the present invention, the glide 300 includes electrical traces 304 which connect to the traces 200 of the removable barriers, to provide power to the sensors and light emitters and optionally to connect the light emitters and sensors to the control unit. The traces 200 may have downward extensions 201, which come into contact with the electrical traces 304 of the glide when the barriers are inserted into the tracks.

In some embodiments of the present invention, each removable barrier 110 includes a central carrier layer 306, and traces 200, sensors 108, and light emitters 106 joined to the central carrier 306. Each removable barrier 110 may also include at least one transparent outer layer 308, which protects the traces 200, the light emitters 106, and the sensors 108. Each removable barrier 110 may also include a clamping hook 310 to secure the removable barrier 110 to the glide 300.

It should be noted that the example of FIG. 5 illustrates a barrier 110 which has emitters 106 on one side and sensors 108 on the other side, as shown in FIG. 1. Therefore, two sets of traces are used, one on each side of the barrier. If the emitters and sensors are on the same side of the barrier (as shown in FIG. 2), a single set of traces 200 is present.

Figure 6:
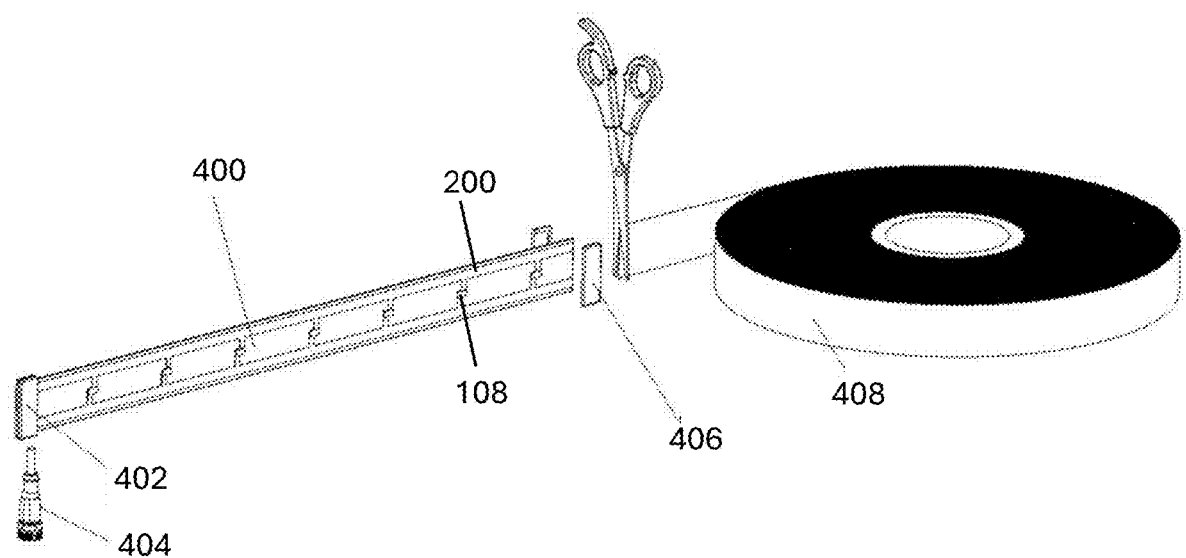
FIG. 6 illustrates a flexible, self-adhesive tape containing one or more light emitters and a plurality of sensors, for joining to a barrier.

FIG. 6 illustrates a flexible, self-adhesive tape containing light emitters and a sensors, for joining to a barrier.

In order to install the system of the present invention on pre-existing shelves having their own barriers, the present invention provides a self-adhesive tape 400 that is attachable to a pre-existing barrier. The tape 400 includes traces 200, sensors 108, and light emitter (not shown). One or both surfaces of the tape 400 may include flexible coating, such as frictionless Teflon™ conformal coating, for example.

The light emitters and sensors may be on different sides. Thus, two lengths of tape are to be attached to a single barrier, in order to achieve the structure of FIG. 1. The first length of tape is attached to a front of the barrier, with the light emitters facing forward and the sensors facing the barrier (thus, the sensors in the first length of tape are not active), while the second length of tape is attached to the back of the barrier with the sensors facing backward and the light emitters facing the barrier (thus, the light emitter of the first length of tape are not active).

The light emitters and sensors may be on the same side. In which case, the length of tape is joined to the front or the back of a barrier, with the sensors and light emitters facing away from the barrier, to achieve the structure of FIG. 2.

The lengths of tape may be cut via scissors or blades. A clip-on power bar 402 may be attached to an end of a length of tape, for connection to power and communications. The connection may be via a connector 404, such as a USB connector, for example. The other end of the length of tape may be covered by a dummy clip-on bar 406 (which is not connected to power and communication), in order to prevent exposure of traces 200. The tape 400 may be provided in a roll 408.

Figure 9:
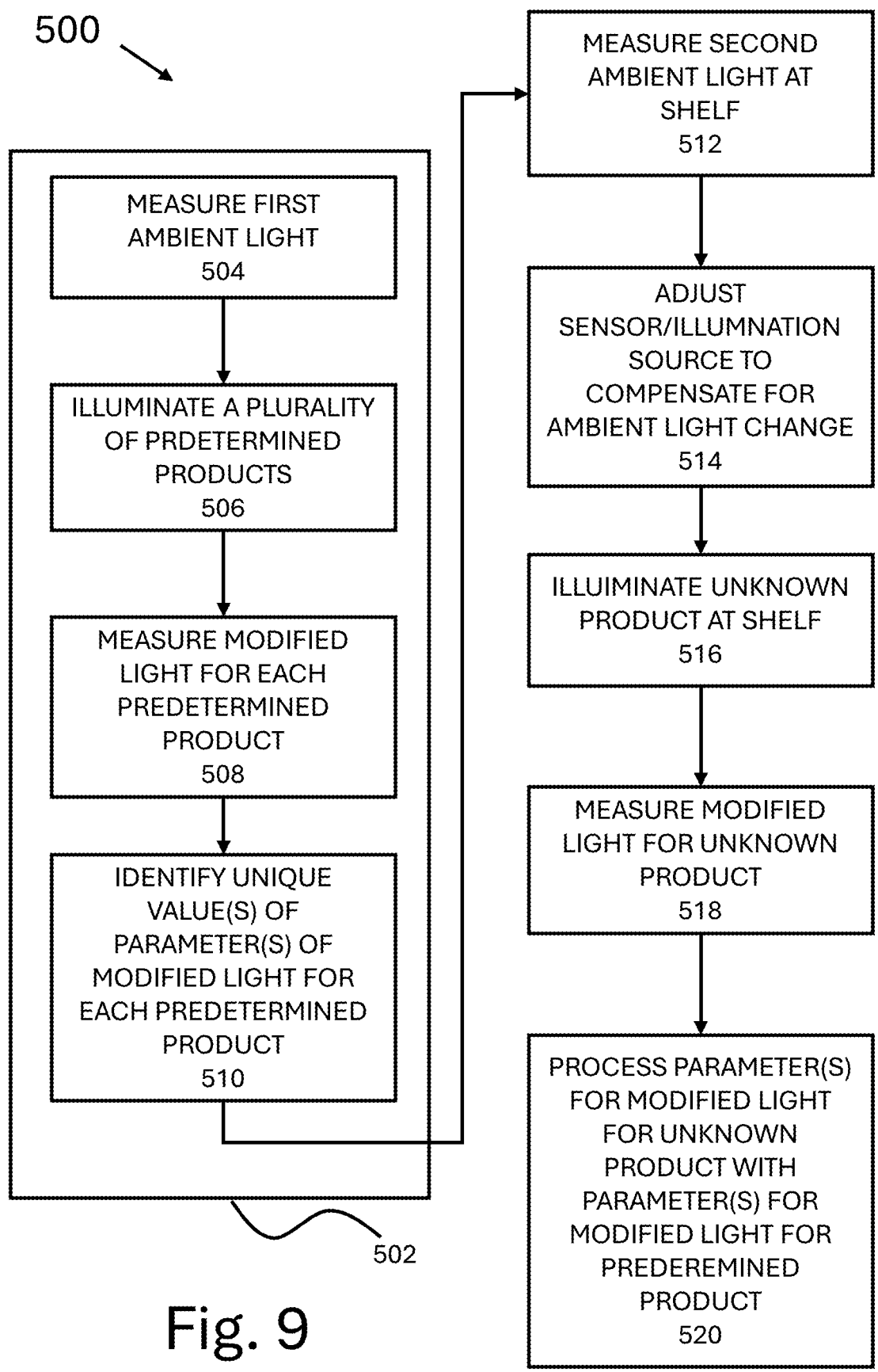
FIG. 9 is a flowchart illustrating a method for identifying a product, according to some embodiments of the present invention.

FIG. 9 is a flowchart 500 illustrating a method for identifying a product, according to some embodiments of the present invention.

In order to compile the database of products with their respective modified light parameters, the products are tested in a laboratory, while consistent ambient light conditions on the laboratory are kept consistent. However, a shelf in a retail store may be exposed to ambient light that changes over time, depending on the time of the day. In most cases, the ambient light in a retail facility does not correspond to the ambient light in the laboratory. Therefore, for the same product, and given the same emitted light, the modified light detected by the sensor in the laboratory may differ from the modified light detected by the sensor in the retail facility. In order to overcome the differences in ambient might conditions and correctly identify products in various facilities, a method is provided according to some embodiments of the present invention, to replicate laboratory ambient light conditions in any facility.

At 502, a database of products and parameters of the modified light corresponding to the products is provided. The database also includes one or more parameters of the ambient light at the laboratory where testing was conducted.

In some embodiments of the present invention to provide the database, values of one or more parameters of a first ambient light are measured at 504. At 506, a light emitter is used to illuminate a plurality of products (one at a time) with emitted light having known values of the one or more parameters. At 508, a sensor located on the same side of the emitter or opposite the emitter detects the modified light (reflected light or transmitted light, as explained above) having interacted with each product and outputs data indicative of one or more parameters of the modified light for each product.

At 510, a unique combination of a value of the one or more parameters of the emitted light and a value of the one or more parameters of the modified light is identified for each product. For example, if the parameter is intensity, a unique combination of an intensity value of the emitted light and an intensity value of the modified light is identified for each product. The unique combination for any given product is substantially different from the combinations corresponding other products.

In some embodiments of the present invention, the emitted light is provided as a sequence of light beams having one or more parameters of different values. FIGS. 10-12 show how this testing is conducted and how the unique combinations are chosen for each product.

FIG. 10 is a table illustrating the choice of intensity values to associate to respective products, according to some embodiments of the present invention.

In the example of FIG. 10, three products are tested. Light is emitted as sequential beams having intensity values I1 to I9. The intensity values of modified light for each product are measured, recorded, and compared. For each product, at each emitted intensity, the intensity value of the modified light is compared to the intensity values of modified light associated with all other products for the same intensity of emitted light. For example, for emitted intensity I1, the modified intensity values I10 (associated with Product 1) is compared to I11 (associated with Product 2) and I12 (associated with Product 3). For emitted intensity I2, the modified intensity values I13 (associated with Product 1) is compared to I14 (associated with Product 2) and I15 (associated with Product 3), and so on.

Focusing only on Product 1, the value of the intensity of modified light that has the largest difference from the closest modified intensity value of all other products is chosen. For example, for I1, |I10-I11| and |I10-I12| are computed. Of these two computed numbers, the smaller one is chosen, which is the absolute value of the difference between the value of the modified light intensity of Product 1 and the closest modified light intensity for a given emitted light intensity of I1. For I2, |I13-I14| and |I13-I15| are computed, and the smaller of the two is chosen.

This is repeated for I3 to I9. Thus, for each intensity value of emitted light, the smallest absolute value of the difference between the modified light intensity of Product 1 and the modified light intensities of the other products is found. The smallest absolute values are now compared to each other, and the largest one of these is chosen for Product 1. The modified light intensity value of Product 1 that is associated with this largest absolute value is chosen as the intensity value of the modified light for Product 1, as at this intensity value, the intensity of the modified light associated with Product 1 is most different than the closest modified value of all other products. For illustration purposes, the unique intensity value of the modified light associated with Product 1 is I28. Therefore, the unique combination of intensity of the emitted light and intensity of the modified light for Product 1 is (I7, I28).

This process is repeated for Product 2 and for Product 3, so the unique combinations associated with Products 2 and 3 are found. For illustration purposes, the unique the unique combination of intensity of the emitted light and intensity of the modified light associated with Product 2 is (I5, I23); the unique combination of intensity of the emitted light and intensity of the modified light associated with Product 3 is (I4, I21).

FIG. 11 is a table illustrating the choice of wavelength values to associate to respective products, according to some embodiments of the present invention.

The table of FIG. 11 is similar to that of FIG. 10, the only difference is that the parameter of the emitted and modified light is the wavelength $\lambda$. The process for identifying the unique wavelength of modified light for each product is the same. For any one product, the smallest absolute value of the differences of modified light wavelengths is identified at each emitted light wavelength, and the largest one of the identified smallest differences is set as the unique wavelength value for each product. For illustration purposes, the unique combination of wavelength value of the emitted light and wavelength value of the modified light associated with Product 1 is ($\lambda$5, $\lambda$22), the unique combination of wavelength value of the emitted light and wavelength value of the modified light associated with Product 2 is ($\lambda$4, $\lambda$20), the unique combination of wavelength value of the emitted light and wavelength value of the modified light associated with Product 3 is ($\lambda$6, $\lambda$27).

FIG. 12 is a table illustrating the choice of combinations of intensity and wavelength values to associate to respective products, according to some embodiments of the present invention.

The table of FIG. 12 is compiled by exposing each Products 1, 2, and 3 to emitted light having different combinations of wavelength and intensities. In order to identify the unique wavelength-intensity combination for a product that is most different than the wavelength-intensity combination of all other product, a function $f(\lambda, I)$ is computed for each modified light. For product 1, at each given emitted light, the functions are subtracted from each other and the smallest difference is selected. For example, for Product 1 at the emitted light having $\lambda$1 and I1, the values $|f(\lambda 4, I4)-f(\lambda 5, I5)|$ and $|f(\lambda 4, I4)-f(\lambda 6, I6)|$ are calculated and the smaller of the two is chosen. This is repeated for all plurality of emitted light beams. Then the largest of the smaller differences is selected as the unique value of modified light of Product 1. For illustration purposes, the unique combination of wavelength-intensity value of the emitted light and the wavelength-intensity value of the modified light associated with Product 1 is [($\lambda$2, I3), ($\lambda$19, I19)], the unique combination of wavelength-intensity value of the emitted light and the wavelength-intensity value of the modified light associated with Product 2 is [($\lambda$3, I2), ($\lambda$26, I26)], and the unique combination of wavelength-intensity value of the emitted light and the wavelength-intensity value of the modified light associated with Product 3 is [($\lambda$3, I2), ($\lambda$9, I9)].

In a non limiting example, $$f(\lambda, I) = a\lambda + bI$$

where a and b are non-variable numbers.

The values of a and b may be established by analyzing the measurements of the table of FIG. 12, and using optimization techniques, such that the unique $f(\lambda, I)$ of most products is most different than the $f(\lambda, I)$ for the same $\lambda$ and I of other products. The optimization may be performed via artificial intelligence (AI) means or via predetermined algorithms.

Going back to FIG. 9, once the value(s) of the parameter (s) of ambient light at lab conditions and the unique combinations of values of the parameter(s) of the emitted light and the modified light at lab conditions are provided, measurements are made on the shelf of the retail facility.

At 512, one or more the parameters (e.g., wavelength and/or intensity) of the second ambient light is measured at the shelf. This may be done by the one or more sensors 108 (FIGS. 1, 2, 5, 6, 7) of the system of the present invention when the light emitters are off, or by an additional sensor located near the shelf. If the parameters of the second ambient light are measured by a plurality of sensors, the value of each parameter of the ambient light may be calculated as a weighted average of the values of the parameter detected by the sensors At 514, compensation for the difference between the ambient light in the lab and ambient light in retail facility is performed. This may be done by adjusting the parameter(s) of the emitted light and/or by adjusting the sensor's sensitivity. The compensation is performed by the local control unit 202 (FIG. 7) controlling the light emitter and/or the sensor, according to predetermined instructions and to measurements of one or more parameters of the ambient light at the retail facility.

If the sensor's sensitivity is adjusted, the sensitivity of the sensor is changed to compensate for a difference between the baseline ambient light at laboratory conditions and the ambient light at the shelf, such that a value of parameter of the ambient light detected by the sensor(s) at the shelf is equal (within a predetermined error) to a value of the parameter in the baseline ambient light, even the baseline ambient light and the ambient light at the shelf are different. If the emitted light is adjusted, an adjustment is made to the parameters of the emitted light, as will be explained further below.

For example, if the intensity of ambient light at the shelf is higher than the intensity of ambient light at lab conditions (for example, if bright sunlight is shining directly on the shelf), the intensity of the emitted light and/or the sensor sensitivity are reduced, compared to the intensity of the emitted light and the sensor sensitivity in the laboratory, to compensate for the ambient light change and ensure that the modified light for same product is the same.

For example, if the intensity of ambient light in the lab is I0 and the intensity of the ambient light at the shelf in the retail facility is IA, the intensity of emitted light in the retail facility I' may be adjusted from the original intensity I at the laboratory as follows:

$$I' = g(I, IA)$$

where g is an experimentally established function.

In a non-limiting example, $$I' = I + c(I0 - IA)$$

Where c is a predetermined multiplier established experimentally to ensure that emitted light I' at the second ambient light and the emitted light I at the first ambient light yield the same modified light for a plurality of products.

Therefore, an increase in ambient light from lab conditions yields a negative value for I0-IA. Thus, the adjusted intensity value is smaller than the original intensity value when ambient light intensity IA at the retail facility is larger than ambient light intensity I0.

In another example, look-up-tables may constructed experimentally, to find I' based on given I and IA.

The experimental procedure for finding the function relating I' to I or for constructing the look-up table may be performed in a laboratory where ambient light conditions are controllable. In the laboratory, a baseline ambient light condition is established, where intensity of the ambient light is I0. Emitted light with different values of I is emitted to interact with a plurality of products (one product at a time). For each product and each value of I, the intensity of the modified light is measured.

The ambient light conditions are then changed, such that intensity of the ambient light is a first value of IA. Emitted light with different values of I' are emitted to interact with a plurality of products (one product at a time). The value of I' that yields modified light having same intensities as the intensities of the modified light at the baseline ambient light for the respective products for a certain value of I is recorded as the value of I' which corresponds to the value of I for a respective IA.

Therefore, for each IA, a value I' is found that corresponds to a respective I. These values may be used to either identify a function g for calculating I' when IA and I are given, or to compile a look-up table, where the value of I' corresponding to a predetermined I can be looked up by matching the value of I to the value of IA, as can be seen in FIG. 15.

Besides intensity, the wavelength of ambient light may differ as well. For example, wavelength at sunset on shelf near a westward-facing window is different than the wavelength at midday for the same shelf. The analysis unit can analyze the ambient light to extract the RGB levels of the ambient light. High ambient intensity of red light (compared to lab conditions) would lead to adjusting the light emitter to have a lower intensity of red light than the corresponding intensity at lab conditions, and vice versa. Similarly, high ambient G intensity (intensity of green) would lead to lowering the G intensity of at the shelf, and vice versa. High ambient B intensity (intensity of blue) would lead to lower the B intensity of the light emitter, and vice versa.

The adjusted intensity of emitted red light ($I_R'$) may be expressed as a first function ($g_R$) of the intensity of the emitted red light at laboratory ambient light conditions and of the intensity IRA of the ambient red light at the shelf. The first function is established experimentally.

$$I_R' = g_R(I_R, I_R A)$$

For example, $$I_R' = I_R + w1(I_R 0 - I_R A)$$

$I_R$ is the intensity of the emitted red light at laboratory ambient light, $I_R'$ is the adjusted intensity of the emitted red light at the shelf, $I_R 0$ is the intensity of the ambient red light in the laboratory ambient light, $I_R A$ is the intensity of the ambient red light at the shelf, w1 is a predetermined multiplier established experimentally to ensure that emitted light $I_R'$ at the second (shelf) ambient light and the emitted light $I_R$ at the first (laboratory) ambient light yield the same intensity of red light in modified light for a plurality of products.

Alternatively, a look-up table is experimentally constructed, where the value of $I_R'$ corresponding to a predetermined $I_R$ can be looked up by matching the value of $I_R$ to the value of $I_R A$.

The experimental procedure than generates the data necessary for determining the function $g_R$ or the look-up table is the same as the experimental procedure used for finding the function g for calculating I', when IA and I are given, or to compile a look-up table, where the value of I' corresponding to a predetermined I can be looked up by matching the value of I to the value of IA, as described above.

The adjusted intensity of emitted green light ($I_G'$) may be expressed as a second function ($g_G$) of the intensity of the emitted green light at laboratory ambient light conditions and of the intensity IGA of the ambient green light at the shelf. The second function is established experimentally.

$$I_G' = g_G(I_G, I_G A)$$

For example, $$I_G' = I_G + w_2(I_G 0 - I_G A)$$

$I_G$ is the intensity of the emitted green light at laboratory ambient light, I'G is the adjusted intensity of the emitted green light at the shelf, $I_G 0$ is the intensity of the ambient green light in the laboratory ambient light, IGA is the intensity of the ambient green light at the shelf, w2 is a predetermined multiplier established experimentally to ensure that emitted light $I_G'$ at the second (shelf) ambient light and the emitted light $I_G$ at the first (laboratory) ambient light yield the same intensity of green light in modified light for a plurality of products.

Alternatively, a look-up table is experimentally constructed, where the value of $I_G'$ corresponding to a predetermined $I_R$ can be looked up by matching the value of $I_G$ to the value of $I_G A$.

The experimental procedure than generates the data necessary for determining the function $g_G$ or the look-up table is the same as the experimental procedure used for finding the function g for calculating I', when IA and I are given, or to compile a look-up table, where the value of I' corresponding to a predetermined I can be looked up by matching the value of I to the value of IA, as described above.

The adjusted intensity of emitted blue light ($I_B'$) may be expressed as a third function ($g_B$) of the intensity of the emitted blue light at laboratory ambient light conditions and of the intensity $I_B A$ of the ambient blue light at the shelf. The third function is established experimentally.

$$I_B' = g_B(I_B, I_B A)$$

For example, $$I_B' = I_B + w_3(I_B 0 - I_B A)$$

$I_B$ is the intensity of the emitted blue light at laboratory ambient light, $I_B'$ is the adjusted intensity of the emitted blue light at the shelf, $I_B 0$ is the intensity of the ambient blue light in the laboratory ambient light, $I_B A$ is the intensity of the ambient blue light at the shelf, w3 is a predetermined multiplier established experimentally to ensure that emitted light $I_B'$ at the second (shelf) ambient light and the emitted light $I_G$ at the first (laboratory) ambient light yield the same intensity of blue light of modified light for a plurality of products.

Alternatively, a look-up table is experimentally constructed, where the value of $I_G'$ corresponding to a predetermined $I_R$ can be looked up by matching the value of $I_G$ to the value of $I_G A$.

The experimental procedure than generates the data necessary for determining the function go or the look-up table is the same as the experimental procedure used for finding the function g for calculating I', when IA and I are given, or to compile a look-up table, where the value of I' corresponding to a predetermined I can be looked up by matching the value of I to the value of IA, as described above.

At 516, an unknown product on a shelf is illuminated by the light emitter. The one or more parameter (I and/or λ) of the emitted light may be adjusted as explained above, to account for the difference between ambient light in the laboratory and ambient light at the shelf in the retail facility.

At 518, the sensor detects the modified light, modified from emitted light by interaction with the unknown product. The sensitivity of the sensor may have been adjusted at 514 to account for the difference between ambient light in the laboratory and ambient light at the shelf in the retail facility, as explained above.

In some embodiments of the present invention, the light emitter is controlled to emit a sequence of light beams, each light beam having respective values of the one or more parameters. If a sequence of beams is emitted, modified light is also received by the sensor in sequence. It should be noted that the values of the parameters in the sequence reflects the parameters of the emitted light associated with the products in the database (as will be shown in FIGS. 16a-c).

The control unit groups together the parameter(s) of each emitted light beams with its corresponding modified light beam, according to the order of reception. In some embodiments, the light emitter is turned off between beams, to enable the control unit to more accurately identify the separate beams of modified light and associate the parameter(s) of the modified light beams to the parameter(s) of the respective emitted light beams.

At 520, the combination of value(s) of the parameter(s) of the emitted light and modified light for the unknown product is (are) compared to the value(s) of the same parameter(s) associated with a plurality of predetermined products, or the value of a function of the parameter(s) of the emitted light and modified light for the unknown product is compared to the value(s) of the same function of the same parameter(s) associated with a plurality of predetermined products. A match between the compared values (within a predetermined error margin) leads to the identification of the unknown product as one of the predetermined products.

FIGS. 16a-c clarify this step. In FIG. 16a, a database is shown, including a list of 9 known products, and for each product a unique combination of first values of parameters of emitted light and first values of modified light. Optionally, a function of the parameters of the modified light is also present for each product.

FIG. 16b relates to the embodiment in which the light emitter is adjusted to compensate for the variability of ambient light. The unknown product has a wavelength Aw (which is an adjustment N'a of predetermined wavelength λa) and an intensity Iw (which is an adjustment I'a of predetermined intensity Ia). The modified light of the unknown product has parameters λj, Ik. Therefore, for the unknown product the adjusted parameters λw, Iw are replaced by the parameters λa, Ia (of which λw, Iw are the adjusted values). Therefore, the combination of parameter values related to the unknown product is [(λa, Ia), (λj, Ik)]. Or, the combination may be recalculated as [(λa, Ia), f(λj, Ik)]. The combination associated with the unknown product is compared to the combinations in the database of FIG. 16a. In this example, it can be seen that Product 1 has the same combination of parameter values as the unknown product. Therefore, the unknown product is identified as Product 1.

FIG. 16c relates to the embodiment in which the sensor's sensitivity is adjusted to compensate for the variability of ambient light. In this case, the emitted light does not need to be adjusted. The unknown product has a wavelength Aw (which is equal to the predetermined wavelength λa) and an intensity Iw (which is equal to predetermined intensity Ia). The modified light of the unknown product has parameters λj, Ik. Therefore, for the unknown product the adjusted parameters λw, Iw are replaced by the parameters λa, Ia (to which λw, Iw are equal). Therefore, the combination of parameter values related to the unknown product is [(λa, Ia), (λj, Ik)]. Or, the combination may be recalculated as [(λa, Ia), f(λj, Ik)]. The combination associated with the unknown product is compared to the combinations in the database of FIG. 16a. In this example, it can be seen that Product 1 has the same combination of parameter values as the unknown product. Therefore, the unknown product is identified as Product 1.

What is claimed is:

1. A system for identifying a product located on a shelf, the system comprising:
   at least one light emitter configured to be disposed on at least one barrier joined to a shelf, the at least one barrier separating respective rows on the shelf, each row configured to hold at least one product;
   one or more light sensors configured to be disposed on the at least one barrier, wherein the one or more light sensors are located at respective positions facing spaces configured to be occupied by respective ones of the at least one product;
   a control unit configured to control an operation of the at least one light emitter and to receive sensor data from each of the one or more light sensors, for transmission of the sensor data indicative of light received by each of the one or more light sensors to an analysis unit configured for identifying the at least one product present in the respective space, based on at least one first value of a parameter of the emitted light and at least one second value of the parameter of modified light received by each of the one or more light sensors, the modified light being light emitted by the at least one emitter and modified by interaction with the respective product.

2. The system of claim 1, wherein the control unit is configured to receive an ambient value of the ambient light at or in a vicinity of the shelf, and to compensate for a difference between the ambient value and a baseline value of the at least one parameter of ambient light, by:
   controlling the at least one emitter to emit the emitted light with an adjusted first value of the at least one parameter, based on the ambient value; and/or
   controlling a sensitivity of at least one the one or more light sensors based on the ambient value.

3. The system of claim 1, comprising a flexible substrate having an adhesive backing, the flexible substrate being configured to be joined to the at least one barrier, wherein the at least one light emitter and the one or more light sensors are laminated on a flexible substrate.

4. The system of claim 3, wherein a trace connecting to the at least one light emitter and the one or more light sensors is laminated on the flexible substrate, the trace being configured to be connected to the control unit for communication between the at least one light emitter and the one or more light sensors and the control unit.

5. The system of claim 1, comprising the at least one barrier, wherein the at least one barrier comprises:
   the at least one light emitter and the one or more light sensors; and
   a clip extending from a bottom corner of the at least one barrier, the clip being configured for removably securing the at least one barrier to the shelf.

6. The system of claim 5, further comprising the shelf, wherein:
   the shelf comprises first traces connected to the control unit;
   the at least one barrier comprises second traces connected to the at least one emitter and to the one or more light sensors;
   upon securing the at least one barrier to the shelf, the first traces electrically connect to the second traces, to form communication lines between the control unit and the at least one emitter and the one or more light sensors.

7. The system of claim 1, wherein the at least one light emitter and the one or more light sensors are configured to be disposed on a same side the at least one barrier, such that for each of one the one or more lights sensors, the light emitted by the at least one light emitter reflects from the respective product back towards the light sensor, such that the modified light is reflected light.

8. The system of claim 1, wherein the at least one light emitter and the one or more light sensors are configured to be disposed on opposite surfaces the at least one barrier, such that for each of one the one or more lights sensors, light emitted by the at least one light emitter of a subsequent barrier transmits through the respective product towards the light sensor, such that the modified light is transmitted light.

9. The system of claim 1, comprising the analysis unit.

10. The system of claim 9, wherein the analysis unit is located remotely from the control unit and communicates with the control unit via a network.

11. The system of claim 10, wherein the network comprises internet.

12. The system of claim 9, wherein:
   the analysis unit stores a database which comprises a list plurality of products, and—for each one of the products of the list—a third value of the at least one parameter of the emitted light and a fourth value of the at least one parameter of the modified light, based on an experimental trial in which the emitted light having the third value of the at least one parameter interacted the product of the list and has yielded the modified light having the at least one fourth value of the at least one parameter, such that a combination of the third value and of the fourth value is unique to the product of the list;
   the analysis unit is configured to identify a product on the shelf as one of the products of the list, by processing the first value, the second value, the third value, and the fourth value.

13. A method for identifying a product on a shelf, the method comprising:
   providing a database which comprises a list of plurality of products, and—for each one of the products of the list—a first value of the at least one parameter of emitted light and a second value of the at least one parameter of modified light, based on an experimental trial in which first emitted light having the first value of the at least one parameter has interacted with the product of the list and has yielded first modified light having the second value of the at least one parameter at a baseline ambient lighting having a baseline value of the at least one baseline parameter, and wherein a combination of the first value and of the second value is unique to the product of the list;
   detecting an ambient value of the at least one parameter of a second ambient light at a shelf;
   providing a light emitter configured to emit a second emitted light, the second emitted light having the at least one parameter with a third value;
   providing a sensor for detecting a second modified light, the second modified light being generated by interaction of the second emitted light with an unknown product, the second modified light having a fourth value of the at least one parameter;
   adjusting a sensitivity of the sensor to compensate for a difference between the first ambient light and the second ambient light, such that an ambient light detected by the sensor is about equal to the first ambient light at the shelf even the first ambient light and the second ambient light are different;
   using the light emitter to illuminate an unknown product on the shelf with the second emitted light, wherein the second value is controlled to correspond to the first value;
   detecting the second modified light via the sensor;
   processing the first value and the second value of the at least one product from the database, and the third value of the fourth value corresponding to the unknown product, to determine whether the unknown product corresponds to one of the products of the plurality of products.

14. The method of claim 13, wherein the processing comprises:
   comparing the fourth value to the second value, to determine whether the unknown product corresponds to the at least one products of the list.

15. The method of claim 13, wherein:
   the database comprises the list of a plurality of products, and—for each one of the products of the list—the first value of a plurality of predetermined first values of the at least one parameter of emitted light and a second value of the at least one parameter of modified light;
   the using of the light emitter to illuminate an unknown product on the shelf with the second emitted light comprises: using the light emitter to illuminate an unknown product on the shelf with the second emitted light, the second emitted light being in the form of a sequence of second emitted light beams, each of the beams having the at least one parameter having a respective third value which corresponds to the a respective one of the first values;
   the second modified light is in form of a sequence of second light modified light beams, each second modified light beam having a respective fourth value of the at least one parameter;
   processing the first value, the second value, the third value, and the fourth comprises processing the combinations of the first values and the second values corresponding to products in the list, and combinations of the respective third values and the respective fourth values associated with the unknown product.

16. A method for identifying a product on a shelf, the method comprising:
   providing a database which comprises a list of comprising at one or more products, and—for each one of the one or more products of the list—a first value of the at least one parameter of emitted light and a second value of the at least one parameter of modified light, based on an experiments trial in which first emitted light having the first value of the at least one parameter has interacted with the product of the list and has yielded first modified light having the second value of the at least one parameter at a baseline ambient lighting having a baseline value of the at least one parameter, and wherein a grouping of the first value and of the second value is unique to the product of the list;

detecting an ambient value of the at least one parameter of a second ambient light at a shelf;

providing a light emitter configured to emit a second emitted light, the second emitted light having the at least one parameter with a third value;

providing a sensor for detecting a second modified light, the second modified light being generated by interaction of the second emitted light with an unknown product, the second modified light having a fourth of the at least one parameter;

adjusting the light emitter to compensate for a difference between the first ambient light and the second ambient light, such that the third value is an adjustment of the first value in the database;

using the light emitter to illuminate an unknown product on the shelf with the second emitted light;

detecting the second modified light via the sensor;

processing the first value and the second value of the one or more products of the list, and the third value and fourth value corresponding to the unknown product, to determine whether the unknown product corresponds to one of the products of the plurality of products.

17. The method of claim 16, wherein:

the database comprises a list plurality of products, and—for each one of the products of the list—a first respective value of a plurality of first predetermined values of the at least one parameter of emitted light and a second value of the at least one parameter of modified light;

the using of the light emitter to illuminate an unknown product on the shelf with the second emitted light comprises: using the light emitter to illuminate an unknown product on the shelf with the second emitted light, the second emitted light being in the form of a sequence of second emitted light beams, each of the beams having the at least one parameter having a respective second value which is an adjustment of a respective one of the plurality of predetermined first values;

the second modified light is in form of a sequence of second light modified light beams, each second modified light beam having a respective fourth value of the at least one parameter;

processing the first value and the second value of the one or more products of the list, and the third value and fourth value corresponding to the unknown product comprises processing the combinations of the first values and the second values from the database, and combinations of the respective first values of which the second values are adjustments of and the respective fourth values.

* * * * *